(12) United States Patent
Croslin

(10) Patent No.: US 6,675,373 B1
(45) Date of Patent: Jan. 6, 2004

(54) AUTOMATIC GENERATION OF BALANCING LOGIC FOR DATA CONVERSION

(75) Inventor: William D. Croslin, Colorado Springs, CO (US)

(73) Assignee: Universal Conversion Technologies, Addison, TX (US)

( * ) Notice: Subject to any disclaimer, the term of this patent is extended or adjusted under 35 U.S.C. 154(b) by 524 days.

(21) Appl. No.: 09/656,492

(22) Filed: Sep. 7, 2000

(51) Int. Cl.[7] ............................................... G06F 9/45
(52) U.S. Cl. ..................................... 717/136; 717/137
(58) Field of Search ................................. 717/136–161, 717/106–109; 712/208–213; 707/4, 200; 703/23–28

(56) References Cited

U.S. PATENT DOCUMENTS

| | | | | |
|---|---|---|---|---|
| 5,742,818 A | * | 4/1998 | Shoroff et al. ............... | 707/200 |
| 5,960,200 A | * | 9/1999 | Eager et al. ................. | 717/147 |
| 5,978,584 A | * | 11/1999 | Nishibata et al. ........... | 717/136 |
| 5,983,240 A | * | 11/1999 | Shoroff et al. ............... | 707/200 |
| 5,987,403 A | * | 11/1999 | Sugimura ..................... | 704/2 |
| 6,031,988 A | * | 2/2000 | Nakashima ................... | 703/26 |
| 6,205,407 B1 | * | 3/2001 | Testa et al. .................. | 702/119 |
| 6,377,958 B1 | * | 4/2002 | Orcutt ......................... | 707/200 |
| 6,523,172 B1 | * | 2/2003 | Martinez-Guerra et al. . | 717/143 |

OTHER PUBLICATIONS

Barry et al. Extracting Parallelism in Fortran by Translation to Single Assignment Intermediate Form. IEEE. 1994. pp. 329–334.*

Hannan. Operational Semantics–Directed Compilers and Machine Architecture. ACM. 1994. pp. 1215–1247.*

Tanazas et al. DPSOL An Executable Requirements Specification Language For Information Processing Systems. IEEE. 1990. pp. 47–54.*

Wu. The Design of a Test Suite for Evaluating a Parallelizing Translator. IEEE. 1992. pp. 173–183.*

* cited by examiner

Primary Examiner—Wei Zhen
(74) Attorney, Agent, or Firm—Lahive & Cockfield, LLP

(57) ABSTRACT

Balancing logic is automatically generated from conversion logic in a data conversion system. The balancing logic balances source data from a source system with the corresponding converted data in a target system. The balancing logic determines whether the conversion was properly performed so as to balance the two varieties of data. The balancing logic is automatically generated by a computer system or other electronic device in response to examining conversion logic that is encoded in a script or other representation.

18 Claims, 8 Drawing Sheets

AUTOMATIC GENERATION OF BALANCING LOGIC FOR DATA CONVERSION

TECHNICAL FIELD

The present invention relates generally to data conversion and more particularly to the automatic generation of balancing logic for data conversion.

BACKGROUND OF THE INVENTION

Data conversion involves converting data from a source system into a format that is suitable for use in a target system. Data conversion may involve multiple facets of conversion. Identifiers may need to be renamed, data may need to be stored in different data structures, and data may need to be stored in different file formats at the target system.

Data conversion is often performed by teams of conversion specialists. These teams examine the source system and the data stored therein. In addition, the conversion specialists examine the target system and the data stored at the target system. The data conversion specialists devise a plan to convert data in the source system into a format that is acceptable to the target system. This conversion may entail the use of computer programs that perform the data conversion. In particular, programs may be used to receive data from the source system and manipulate the data into a suitable format for use by the target system.

One of the drawbacks of current efforts at data conversion is that data conversion is very time consuming and cumbersome. Many of the inefficiencies are due to redundancies that are performed during the data conversion process. One such redundancy is found with balancing logic. The balancing logic seeks to "balance" the data at the source system with the data at the target system to insure that conversion has been properly performed. For example, suppose that the data field in the source system is stored as a serial stream, but the corresponding data needs to be stored as an array of characters in the target system. The balancing logic compares the data in the source system with the corresponding data stored at the target system after conversion to ensure that the data was stored in the proper format for the target system. In other words, a check is made that data is "balanced." The comparison of data performed by the balancing logic may also be performed by the conversion logic to determine how to convert the data from a source system into a format that is accepted for the target system. Hence, there is redundancy between the balancing logic and the conversion logic.

SUMMARY OF THE INVENTION

The present invention provides the automatic generation of balancing logic based on conversion logic in a data conversion system. The automatic generation of the balancing logic eliminates the redundancy of effort required when the balancing logic and conversion logic are separately developed.

In one embodiment of the present invention, a script is provided for mapping data from the source system to the target system. The script may be especially designed for use by a data conversion system. The script is processed by a parser to generate computer program instructions. The computer program instructions perform the data conversion and balance the data.

In accordance with one aspect of the present invention, a method is performed in a data conversion system. The data conversion system converts data from a source system into an acceptable format for a target system. Pursuant to this method, computer program instructions are generated for conversion logic for converting the data into the converted data. Based on the conversion logic, computer programming instructions for balancing logic are generated. The balancing logic balances the data in the source system with the converted data in the target system to ensure that the converting has been properly performed by the conversion logic.

In accordance with another aspect of the present invention, a method converts original data used in a source data processing system into converted data for use in a target data processing system. The method is performed on a computer system, and the method employs a script that specifies how to convert the original data into the converted data. The script is parsed with a parser to generate both conversion logic for converting the original data into the converted data and balancing logic for ensuring that the conversion logic properly converts the original data into the converted data. The conversion logic and the balancing logic comprise computer instructions. The balancing logic is automatically generated by the parser based on the conversion logic.

In accordance with another aspect of the present invention, the data conversion system includes a storage and a processor. The storage holds a copy of a script for identifying how to convert data used in a source system into converted data for a target system. The storage also holds a parser for parsing the script to produce converting logic for converting the data used in the source system into the converted data and to produce balancing logic for confirming that the converting was properly performed. The processor executes both the script and the parser.

In accordance with another aspect of the present invention, the data conversion system is designed for converting data from a source system into an acceptable format for a target system.

BRIEF OF THE DRAWINGS

An illustrative embodiment of the present invention will be described below relative to the following drawings.

DETAILED DESCRIPTION OF THE INVENTION

The illustrative embodiment of the present invention provides a data conversion system that automatically generates balancing logic by examining conversion logic contained within a script. In the illustrative embodiment, the script is specifically designed to identify actions to be performed during data conversion. The script is parsed by a parser to generate computer program instructions for implementing the conversion logic and the balancing logic. The automatic generation of the balancing logic helps to eliminate redundancies of effort that would otherwise be present in the data conversion process.

The balancing logic "balances" data from a source data processing system with data in a target data processing system. The data in the target data processing system has been converted from the data in the source data processing system. The balancing entails comparing the data in the respective data processing systems and determining whether the conversion has properly been performed. The script may also contain guidance as to how to correct any discrepancies or errors in the converted data.

Figure 1:
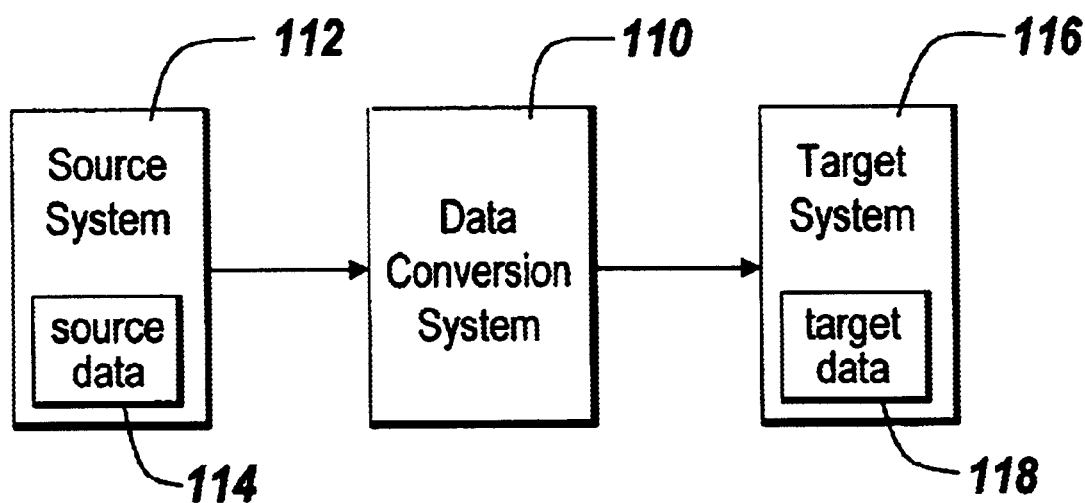
FIG. 1 is a block diagram illustrating the relationship between the data conversion system, a source system and a target system in the illustrative embodiment.

FIG. 1 is a block diagram illustrating respective components involved in the practice of the illustrative embodiment of the present invention. A source system 112 contains source data 114. The source system 112 may be any of a number of different types of data processing systems. For example, the source system may be a large mainframe system with large amounts of secondary storage, such as magnetic tape, optima storage and the like. The source system may also be a minicomputer system or even one or more personal computer systems. The source data 114 may take many forms depending on the nature of the source system 112. For example, the source data 114 may contain information regarding insurance policies in the case where the source system 112 is a data processing system for an insurance company.

The source data 114 is converted by a data conversion system 110 into target data 118 for use by a target system 116. The target system 116 may take many different forms, such as those discussed above relative to the source system. The target data 118 may contain a number of different file formats, data structures and the like.

The data conversion system 110 may include one or more computer systems for converting the source system 114 into the target data 118. The data conversion system 110 may run automated programs to perform data conversion. In the illustrative embodiment, the data conversion system 110 may run scripts that specify datamaps. The datamaps specify how data in the source data 114 is to be mapped into the target data 118. Multiple datamaps may be used in a single data conversion project. Each datamap may be associated with a logical grouping of data. The datamaps, which are written in script, are processed by a parser to yield computer programs that perform the data conversion, balancing functions and corrective functions. A suitable scripting language is the UCT script language developed by Universal Conversion Tools, Inc. The computer programs that are generated by parsing the script may be in a number of different computer languages but preferably are written in a high-level computer programming language, such as COBOL, to ease debugging and review by a conversion specialist.

Figure 2:
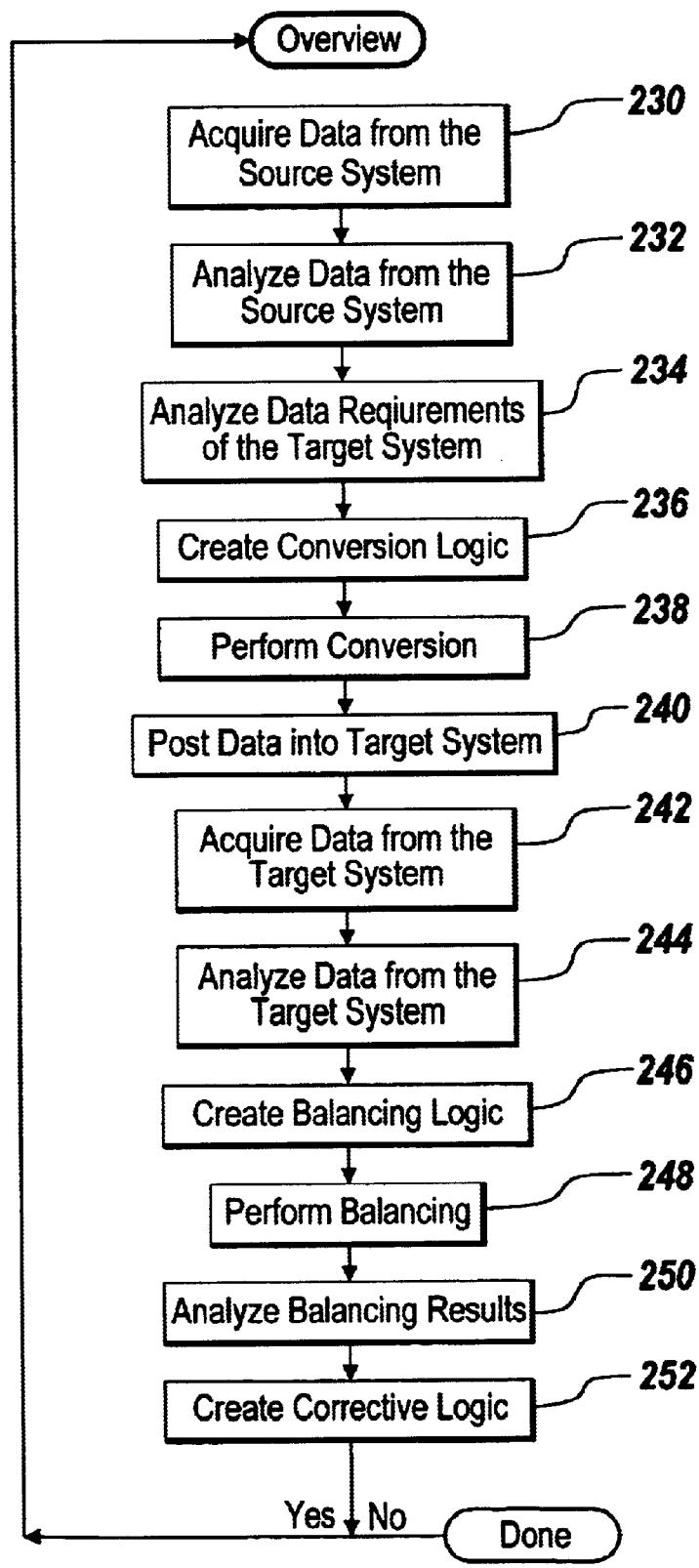
FIG. 2 is a flow chart providing an overview of the data conversion process.

FIG. 2 is a flow chart that provides an overview of the steps that are performed in the illustrative embodiment to convert the data. Initially, the source data must be acquired from the source system (step 230 in FIG. 2). This step entails obtaining the source data 114 for later analysis and manipulation. The obtained source data 114 is then analyzed (step 232 in FIG. 2). The analysis involves identifying the layout and format of the data. The analysis may entail identifying the organization of the data, identifying what file formats are used, identifying what data types are used and identifying data structures that are used.

The data requirements of the target system 116 are then analyzed (step 234 in FIG. 2). This analysis entails identifying what requirements are needed or desired of the target data 118. The conversion logic is created to fulfill the identified data requirements of the target system (step 236 in FIG. 2). In particular, the conversion logic is represented in a script of a datamap for mapping the source data 114 into the target data 118.

At this point the conversion logic created in step 236 of FIG. 2 is executed to perform the conversion (step 238 in FIG. 2), and the generated data for the target system is posted into the target system (step 240 in FIG. 2).

Data is then acquired from the target system 116 (step 242 in FIG. 2) and analyzed (step 244 in FIG. 2). Once the analysis is complete, balancing logic is created (step 246 of FIG. 2) based on the conversion logic to ensure that the data was properly converted (step 238 in FIG. 2). The balancing logic is then employed (step 248 of FIG. 2).

The results of the balancing performed by the balancing logic are analyzed (step 250 in FIG. 2). In particular, a check is made whether the balancing logic successfully balanced the target source data 118 with the source data 114. Corrective logic to remedy any errors may then be created and employed (step 252 in FIG. 2).

Those skilled in the art will appreciate that the sequence of steps shown in FIG. 2 is intended to be merely illustrative and not limiting of the present invention. Some of the steps may be performed together. In addition, the ordering of the steps may be slightly modified in some instances.

Figure 3:
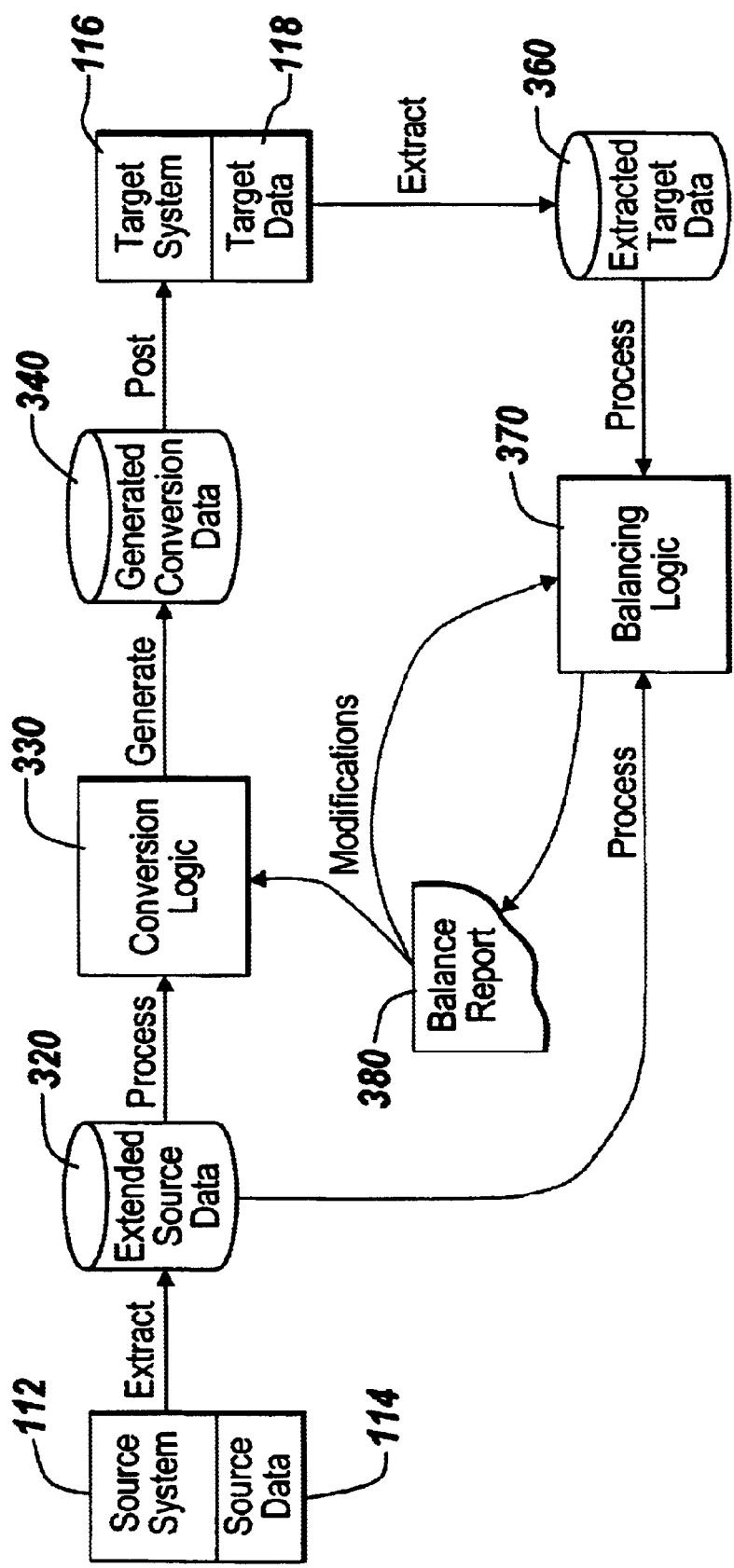
FIG. 3 illustrates data flow in the illustrative embodiment of the present invention.

FIG. 3 provides a flow chart illustrating the data flow in a conversion and balancing process in accordance with the illustrative embodiment. Data is extracted from the source system data 114 to produce a set of data to be processed during the conversion (320 in FIG. 3). This extracted data is then processed by the conversion logic (330 in FIG. 3). This conversion logic generates conversion data (340 in FIG. 3) that needs to be posted into the target system 116. To then facilitate balancing, the target system data 118 is extracted (360 in FIG. 3) and is then processed by the balancing logic (370 in FIG. 3) in order to check for conversion errors. Any identified conversion errors are output to a balancing report (380 in FIG. 3). This balancing report is reviewed and any necessary modifications are made to the conversion logic (330 in FIG. 3) and/or the balancing logic (370 in FIG. 3).

Figure 4:
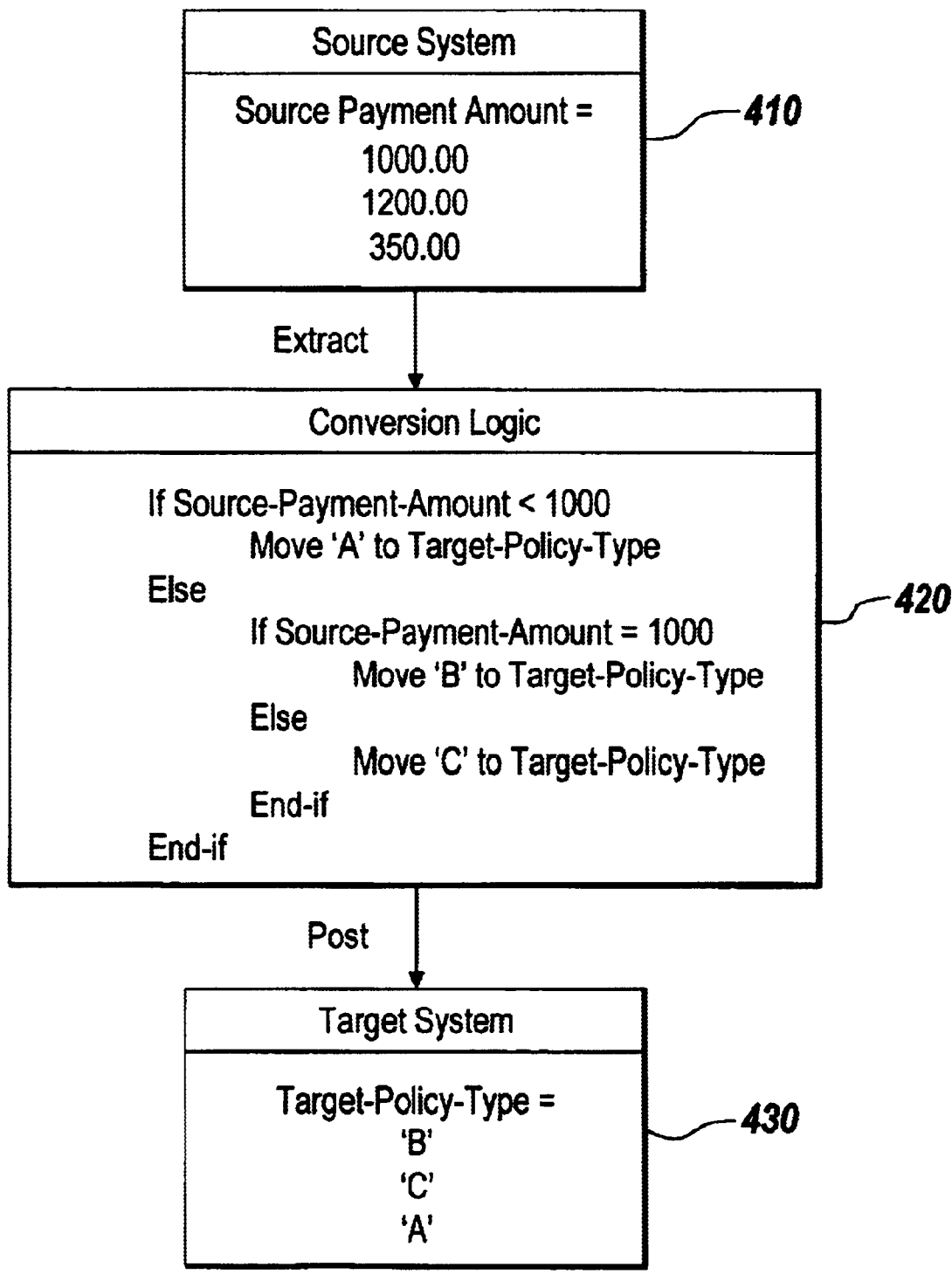
FIG. 4 illustrates an example of the conversion process in the illustrative embodiment.

FIG. 4 provides an illustration of the conversion process and the necessary conversion logic involved. This is a simplified example that demonstrates how conversions can entail more than a simple movement of a data value. In this example, the target data field 'TARGET-POLICY-TYPE' needs to be defined based on the value assigned to the source data field 'SOURCE-PAYMENT-AMOUNT'. The example requires that TARGET-POLICY-TYPE be set to and 'A' value if the SOURCE-PAYMENT-AMOUNT is less than $1000.00. Similarly, the TARGET-POLICY-TYPE should be set to 'B' if the SOURCE-PAYMENT-AMOUNT is exactly equal to $1000.00. And finally, the TARGET-POLICY-TYPE should be set to 'C' if the SOURCE-PAYMENT-AMOUNT is greater than $1000.00.

As can be seen in FIG. 4, there are three source values for SOURCE-PAYMENT-AMOUNT:1000.00, 1200.00 and 350.00 (410 in FIG. 4). The conversion logic that is needed to properly convert these values based on the previously described rules is listed in 420 of FIG. 4. The resulting values for the TARGET-POLICY-TYPE are 'B', 'C' and 'A' (430 in FIG. 4). As per FIG. 4, it can be seen that data is extracted from the source system 112 and posted into the target system 116 during the execution of the conversion logic (420 in FIG. 4).

Figure 5:
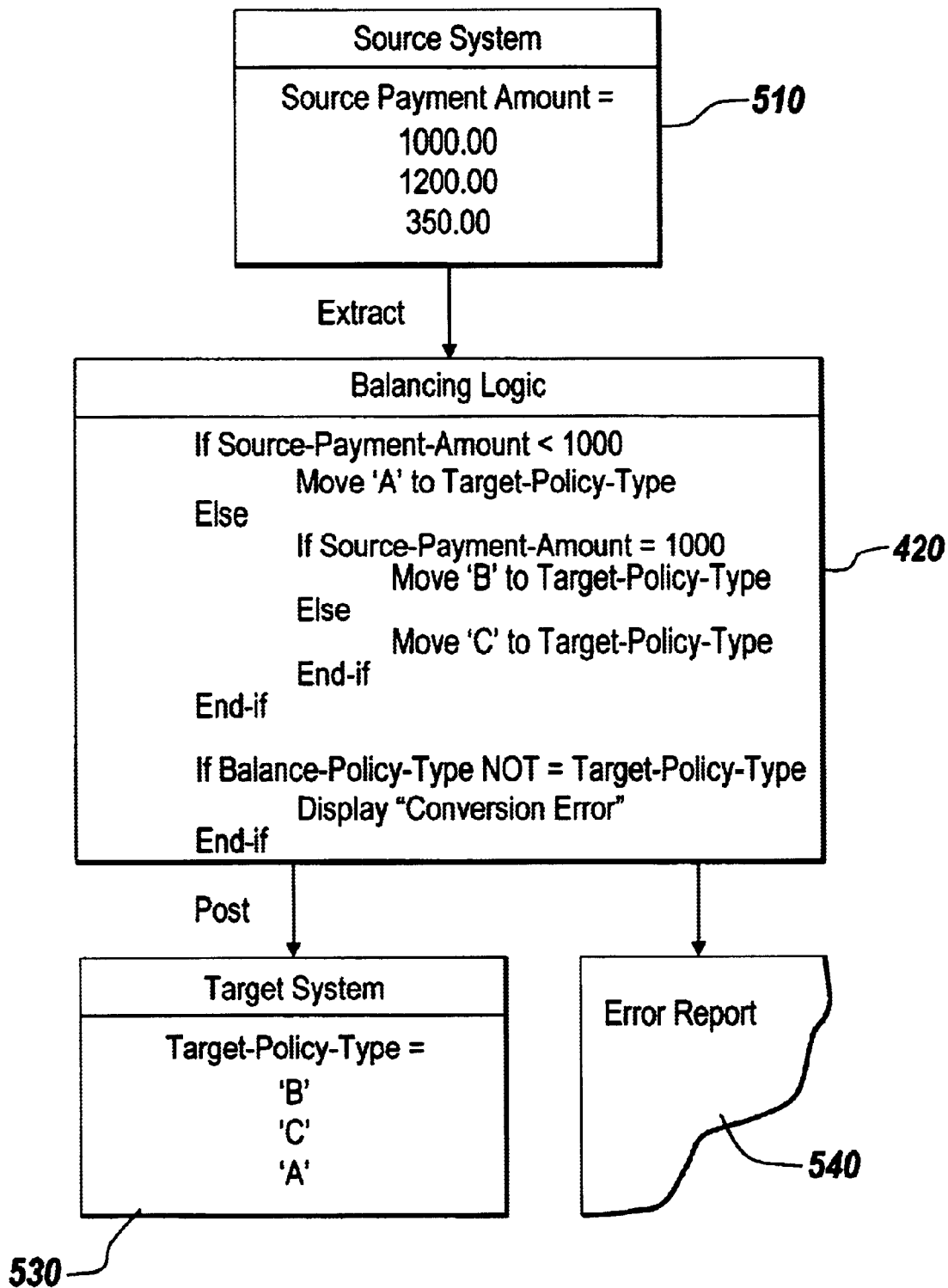
FIG. 5 illustrates balancing logic for the example of FIG. 4.

FIG. 5 provides the corresponding balancing logic needed to independently verify that the conversion, as specified in FIG. 4, was properly completed. As in the case for the conversion in FIG. 4, the source system data 114 (510 in FIG. 5) is extracted into and processed by the balancing logic (520 in FIG. 5). However, the values for TARGET-POLICY-TYPE created by the conversion logic (420 in FIG. 4) and stored in the target system data 118 (430 in FIG. 4) are now extracted and processed by the balancing logic (520 in FIG. 5). An examination of the conversion logic (420 in FIG. 4) and the balancing logic (520 in FIG. 5) illustrates the great similarities between the conversion and balancing logic. Both the conversion and balancing logic must have logic sufficient to implement the rules of the conversion. The balancing logic must then only ask if the rules of the conversion were properly accomplished by the conversion logic. If the value stored in the target system data 118 does not match the value which the conversion created, then the posting of the information into the target system 116 has failed and the error needs to be reported to the analyst performing the conversion for further action (540 in FIG. 5).

Figure 6:
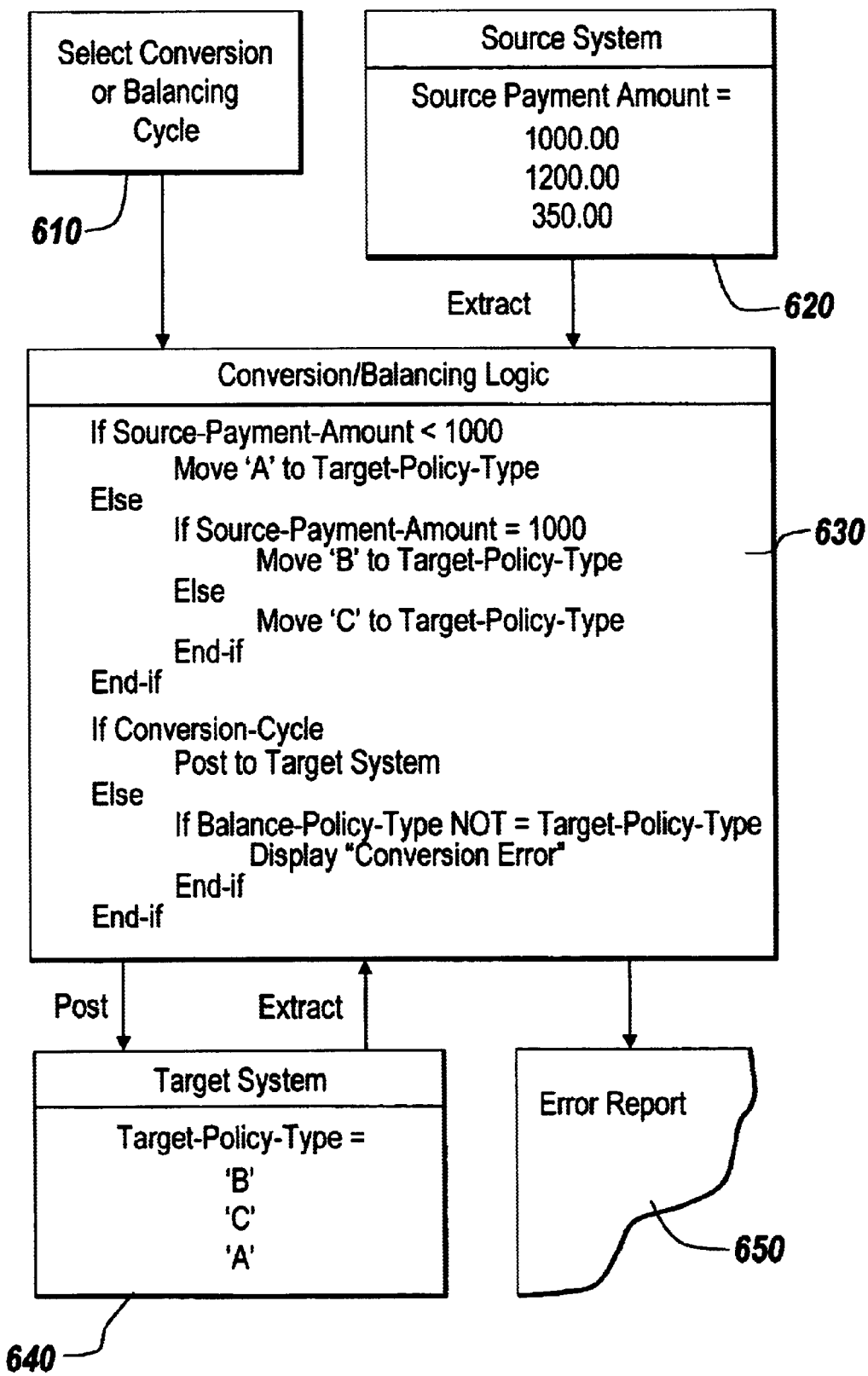
FIG. 6 illustrates an example of the combination of the conversion logic and blancing logic provided in the illustrative embodiment.

FIG. 6 illustrates the combination of the conversion and balancing logic as per the illustrative embodiment of the present invention. The generated conversion/balancing logic (630 in FIG. 6) is executed after the user specifies whether they are performing a conversion cycle or a balancing cycle (610 in FIG. 6). The source system data 114 is extracted (620 in FIG. 6). Similarly, if a balancing cycle is specified, then target system data 118 is extracted (640 in FIG. 6). The conversion/balancing logic is then executed (630 in FIG. 6) and depending on the chosen cycle, the target system data is updated or the balancing error report is created (650 in FIG. 6).

Figure 7:
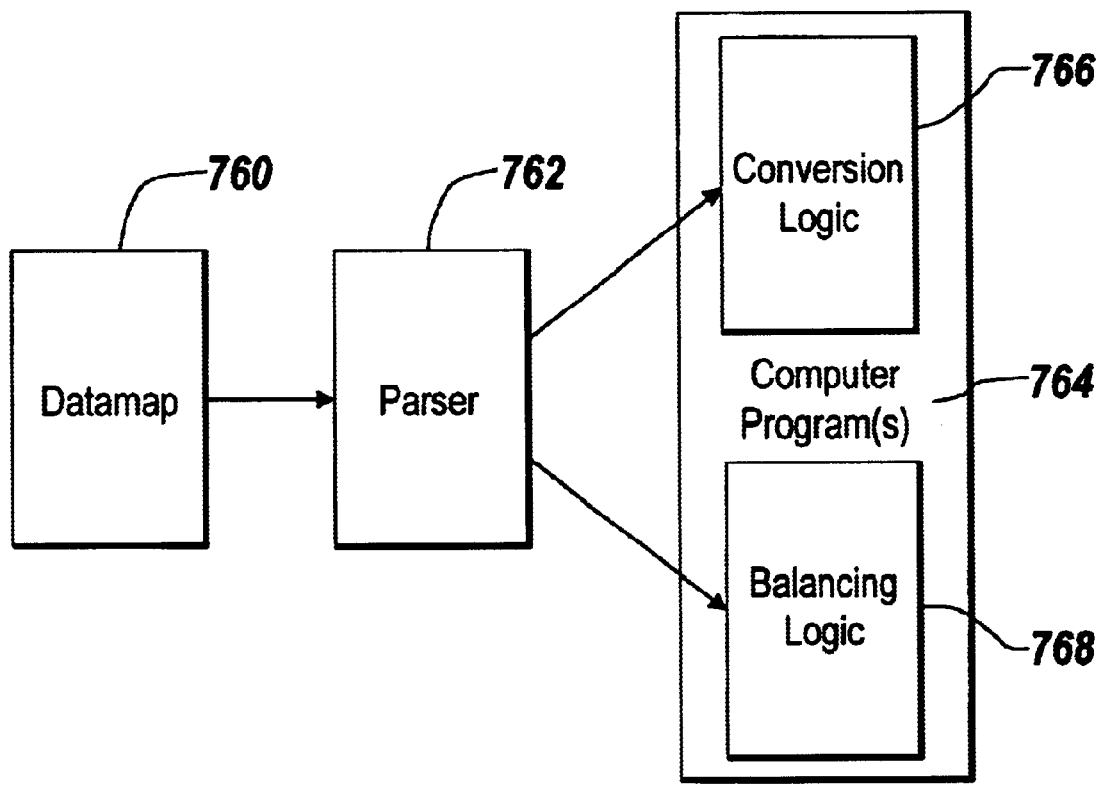
FIG. 7 shows data flow for a portion of the illustrative embodiment

FIG. 7 illustrates the data flow of a portion of the illustrative embodiment of the present invention. A datamap 760 written in the scripting language is processed by a parser 762. The parser 762 operates in two passes. In the first pass, the parser 762 processes the datamap 760 to generate the conversion logic 766. As was mentioned above, the conversion logic 766 is implemented in computer program instructions, such as COBOL programming language instructions. In a second pass, the datamap 760 is processed by the parser 762 to generate the balancing logic 768. The balancing logic 768 also contains computer program instructions for performing the balancing. Thus, the conversion logic 766 and the balancing logic 768 constitute one or more computer programs that are produced by the parser 762 parsing the datamap 760. A parser 762 contains the intelligence for examining the conversion logic 766 as specified in the datamap 760 to automatically generate the balancing logic 768. This dynamic creation of balancing logic 768 from the conversion logic 766 greatly reduces the amount of programming involved in completing a given data conversion project. In addition, the manpower required to perform both conversion and balancing may be reduced so as to same time and expense during the data conversion project.

Figure 8:
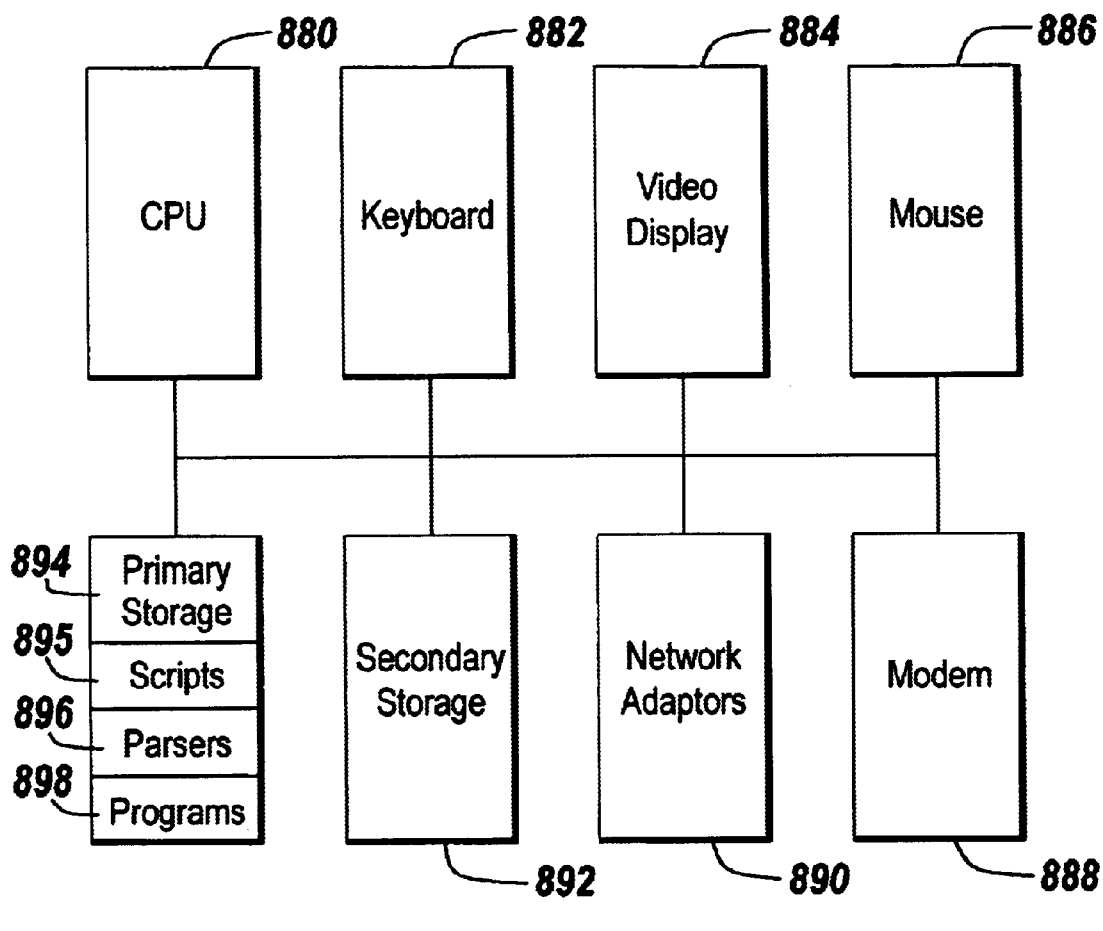
FIG. 8 is a block diagram of a computer system that may be used to realize the data conversion system of the illustrative embodiment.

FIG. 8 depicts a computer system that is suitable for implementing the data conversion system 110. The computer system includes a central processing unit (CPU) 880, which may be realized as any of a number of different commercially available microprocessors. The data conversion system 110 may also include a keyboard 882, a video display 884 and a mouse 886. Those skilled in the art will appreciate that the data conversion system 110 may include a different set of input/output devices in some instances. The data conversion system 110 may include a modem 888 for communicating over conventional telephone lines, cable lines or wireless communication paths. The data conversion system 110 may include a network adapter 890 for interfacing a data conversion system with a network.

The data conversion system 110 may include both primary storage 894 and secondary storage 892. These storages 892 and 894 may contain sets of programs and data. These programs may include scripts 895 (i.e. the datamaps for performing data conversion and balancing), a parser 896 for parsing the scripts and the resulting programs 898 that are produced by the parser.

An example is helpful to illustrate the operation of the illustrative embodiment of the present invention. Set forth below is an example of a portion of a datamap. The datamap contains the following script.

| TARGET-POLICY-TYPE | IF SOURCE-PAYMENT-AMOUNT < 1000 |
| --- | --- |
| | MOVE 'A' |
| | ELSE |
| | IF SOURCE-PAYMENT-AMOUNT = 1000 |
| | MOVE 'B' |
| | ELSE |
| | MOVE 'C' |
| | END-IF |
| | END-IF |
| | BALANCE |
| | COMPARE TO BALANCE-POLICY-TYPE |
| | IF NO-MATCH |
| | REPORT 'CONVERSION ERROR' |
| | END-IF |
| | END-BALANCE |

The above section of the script defines conversion logic to create the TARGET-POLICY-TYPE based on values assigned to the SOURCE-PAYMENT-AMOUNT. Also, the script defines balancing logic to produce an error message if the conversion is not successful. As detailed and illustrated in the descriptions of FIGS. 4, 5 and 6, both the conversion and balancing process require virtually identical logic. The logic contained between the BALANCE and END-BALANCE statements will only be processed in the event the user specifies that the balancing cycle is being processed.

When this script is processed by the parser 862, the following COBOL programming instructions are generated.

```
013800*****************************************************
013900*CODE GENERATED FOR TARGET-POLICY-TYPE         *
014000*****************************************************
014100 P5000-ELE-001-START.
014200
014300   IF NOT (SOURCE-PAYMENT-AMOUNT < 1000)
014400     GO TO P5000-ELE-001-LBL-001.
014500
014600   MOVE 'A' TO TARGET-POLICY-TYPE.
014700
014800   GO TO P5000-ELE-001-LBL-002.
014900
015000 P5000-ELE-001-LBL-001.
015100   IF NOT (SOURCE-PAYMENT-AMOUNT = 1000)
015200     GO TO P5000-ELE-001-LBL-003.
015300
```

```
-continued

015400   MOVE 'B' TO TARGET-POLICY-TYPE.
015500
015600   GO TO P5000-ELE-001-LBL-004.
015700
015800 P5000-ELE-001-LBL-003.
015900   MOVE 'C' TO TARGET-POLICY-TYPE.
016000
016100 P5000-ELE-001-LBL-004.
016200
016300 P5000-ELE-001-LBL-002.
016400
020800   IF BALANCE-PROCESSING
020900     PERFORM BAL01-ELE-001
021000   END-IF.
021100
```

As can be seen, certain of the script statements are directly translated into corresponding COBOL language instructions while other script statements are expanded into multiple COBOL language instructions. The parser 862 also generates the following balancing logic instructions for the associated section of script.

```
175000*******************************************************
175100*BALANCE CODE GENERATED FOR TARGET-POLICY-
TYPE
175200*******************************************************
175300 BAL01-ELE-001 SECTION.
175400
175500* COMPARE: TARGET-POLICY-TYPE
175600*    TO: BALANCE-POLICY-TYPE
175700   IF TARGET-POLICY-TYPE = BALANCE-POLICY-TYPE
175800     SET BALANCE-MATCH TO TRUE
175900     SET BALANCE-IN-TOLERANCE TO TRUE
176000   ELSE
176100     SET BALANCE-NO-MATCH TO TRUE
176200     SET BALANCE-OUT-TOLERANCE TO TRUE
176300   END-IF.
176400
176500   IF NOT (BALANCE-NO-MATCH)
176600     GO TO BAL01-ELE-001-LBL-005.
176700
176800   IF AD-REPORT-COUNT >= AD-MAX-REPORT-COUNT
176900     DISPLAY '****MAX OF 500 REPORT LINES - FULL
BUFFER***'
177000   ELSE
177100     MOVE SPACES TO REPORT-WORK-BUFFER
177200     MOVE 1 TO REPORT-WORK-INDEX
177300     STRING*''CURRENT-IDENTIFIER*''DELIMITED BY SIZE
177400       INTO REPORT-WORK-BUFFER WITH POINTER
177500       REPORT-WORK-INDEX
177600     STRING*,''CKAGALLO*''DELIMITED BY SIZE INTO
177700       REPORT-WORK-BUFFER WITH POINTER REPORT-
WORK-INDEX
177800     STRING*,''CONVERSION ERROR*''DELIMITED BY
SIZE INTO
177900       REPORT-WORK-BUFFER WITH POINTER REPORT-
WORK-INDEX
178000     STRING*,''TARGET-POLICY-TYPE*''DELIMITED BY
SIZE
178100       INTO REPORT-WORK-BUFFER WITH POINTER
178200       REPORT-WORK-INDEX
178300     ADD 1 TO AD-REPORT-COUNT
178400     MOVE REPORT-WORK-BUFFER
178500       TO AD-REPORT-LINE(AD-REPORT-COUNT)
178600   END-IF.
178700
178800 BAL01-ELE-001-LBL-005
178900
179000 BAL01-ELE-001-EXIT.
179100   EXIT.
179200
```

While the present invention has been described with reference to an illustrative embodiment thereof, those skilled in the art will appreciate that various changes in form and detail may be made without departing from the intended scope of the present invention as defined in the appended claims.

What is claimed is:

1. In a data conversion system for converting data from a source system into an acceptable format for a target system, a method comprising the steps of:

generating computer program instructions for conversion logic for converting data into converted data; and based on the conversion logic, generating computer program instructions for balancing logic that balances the data in the source system with the converted data in the target system to ensure that the converting has been properly performed by the conversion logic.

2. The method of claim 1, wherein the generating steps are performed by a single tool.

3. The method of claim 1, wherein the balancing logic is generated without input from a user of the data conversion system regarding how to balance the data in the source system with data in the target system.

4. The method of claim 1, wherein the conversion logic converts data from a first format to a second format.

5. The method of claim 1, wherein the conversion logic renames fields in the data.

6. The method of claim 1, wherein the conversion logic modifies data types of at least some of the data.

7. The method of claim 1, wherein the balancing logic compares the data from the source system with the converted data for the target system.

8. In a data conversion system for converting data from a source system into an acceptable format for a target system, said data conversion system including at least one computer system, said computer system including a medium holding computer-executable steps for performing a method, said method comprising the steps of:

generating computer program instructions for conversion logic for converting data into converted data; and based on the conversion logic, generating computer program instructions for balancing logic that balances the data in the source system with the converted data in the target system to ensure that the converting has been properly performed by the conversion logic.

9. The medium of claim 8, wherein the generating steps are performed by a single tool.

10. The medium of claim 8, wherein the balancing logic is generated without input from a user of the data conversion system regarding how to balance the data in the source system with data in the target system.

11. The medium of claim 8, wherein the conversion logic converts data from a first format to a second format.

12. The medium of claim 8, wherein the conversion logic renames fields in the data.

13. The medium of claim 8, wherein the conversion logic modifies data types of at least some of the data.

14. The medium of claim 8, wherein the balancing logic compares the data from the source system with the converted data for the target system.

15. In a computer system, a method for converting original data used in a source data processing system into converted data for use in a target data processing system, comprising the steps of:

providing a script that specifies how to convert the original data into the converted data;

parsing the script with a parser to generate both conversion logic for converting the original data into the converted data and balancing logic for ensuring that the conversion logic properly converted the original data into the converted data; and wherein the conversion logic and the balancing logic comprise computer instructions and wherein the balancing logic is automatically generated by the parser based on the conversion logic.

16. The method of claim 15, wherein the computer instructions are in a high level programming language.

17. The method of claim 15, wherein the script is written in a scripting language specifically designed for data conversion.

18. The method of claim 15, wherein the balancing logic compares the original data with the converted data.

* * * * *